Sept. 5, 1961     A. A. APFELZWEIG     2,998,743
TOGGLE BOLT
Filed March 31, 1960
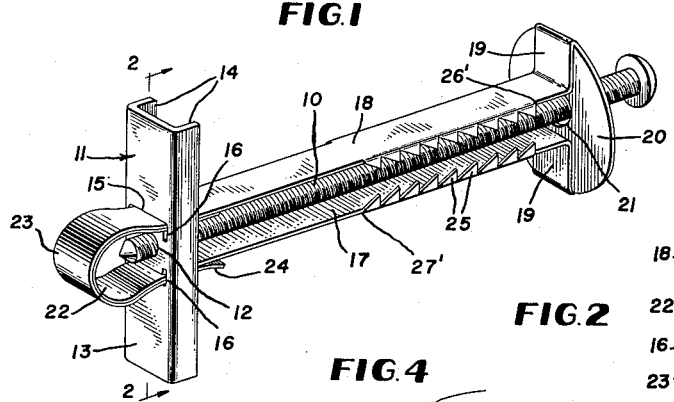
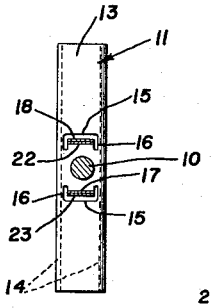
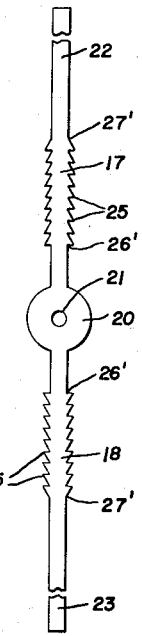
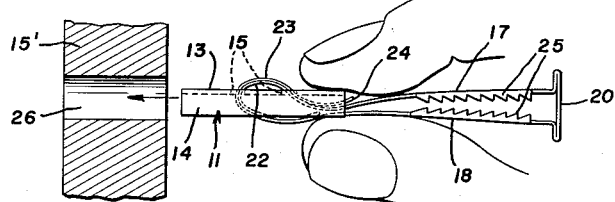
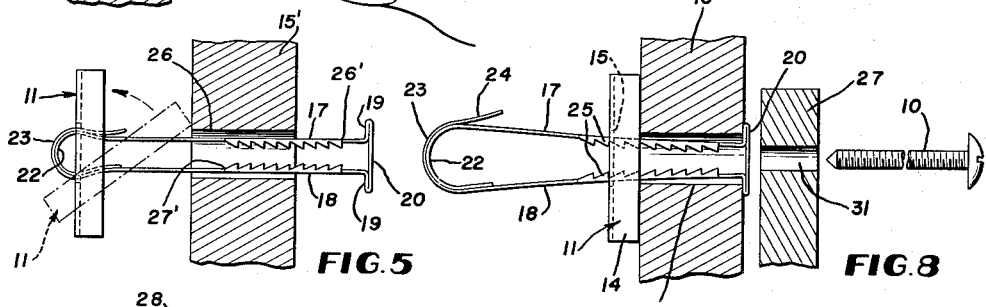
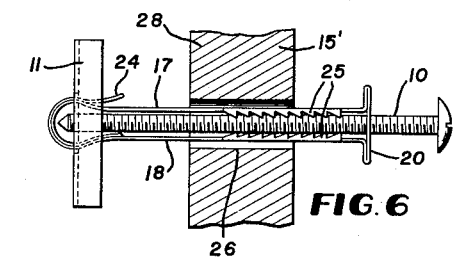
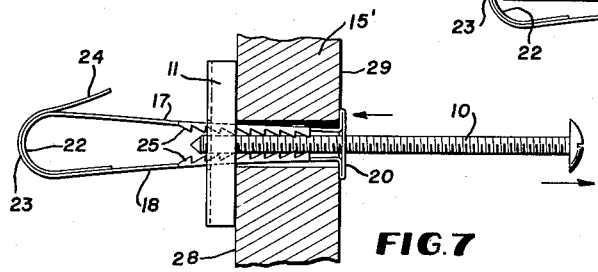
INVENTOR.
ALEX A. APFELZWEIG
BY
ATTORNEY United States Patent Office 2,998,743
Patented Sept. 5, 1961

2,998,743
TOGGLE BOLT
Alex A. Apfelzweig, 521 Ashbury Ave., Santa Rosa, Calif.
Filed Mar. 31, 1960, Ser. No. 18,897
3 Claims. (Cl. 85—3)

This invention relates to toggle bolts.

A primary object of the invention is to provide a simplified and highly effective toggle bolt which may be mass produced at extremely low cost.

A further object of the invention is to provide a toggle bolt which is sturdy and durable in construction, simplified, very easy to manipulate and install, and requiring the very minimum size wall opening to accommodate the toggle bolt during installation of the same.

Another object is to provide a toggle bolt of great strength by virtue of the one-piece construction of the head or toggle element.

Still another object is to provide a toggle bolt providing the greatest possible bearing area for the head or toggle element against the interior wall surface.

Another object is to provide a toggle bolt which may utilize a screw of substantially any desired length, as well as a wide range of diameters.

Another important object of the invention is to provide a toggle bolt which may be mounted securely within a wall opening, and then have the bolt or screw removed before the device to be secured to the wall is brought into place, the screw then being readily re-engageable with the head or toggle element upon the inner face of the wall without difficulty.

Still another object is to provide means for guiding the screw into engagement with the screw-threaded toggle element.

Other objects and advantages of the invention will be apparent during the course of the following description.

In the accompanying drawings, forming a part of this application, and in which like numerals are employed to designate like parts throughout the same, FIGURE 1 is a perspective view of a toggle bolt embodying the invention, FIGURE 2 is a transverse vertical section taken on line 2—2 of FIGURE 1, FIGURE 3 is a plan view of a sheet metal blank employed to form the resilient arms of the toggle bolt, FIGURES 4 through 9 are side elevational views, partly in section, of the toggle bolt illustrating the steps for mounting the same within a wall opening and mounting the object to be secured to the wall.

In the drawings, wherein for the purpose of illustration is shown a preferred embodiment of the invention, attention is directed first to FIGURES 1 through 3, wherein the numeral 10 designates a bolt element or screw of the desired length and diameter and being of a conventional type. A transverse elongated channel-shaped head or toggle element 11 for coaction with the screw 10 is provided, and this head has a centrally located screw-threaded opening 12 formed through its front wall 13, and adapted to receive the screw, as indicated. The head 11 further embodies parallel longitudinal side flanges 14 which face the inner surface of the wall 15' during use.

On opposite sides of the screw-threaded opening 12 and near the same, the front wall 13 of head 11 is provided with a pair of opposed generally U-shaped slots 15, formed through the wall 13, and arranged as shown clearly in FIGURE 2. The sides 16 of the U-shaped slots 15 are disposed near and inwardly of the flanges 14. The U-shaped slots 15 serve a purpose shortly to be described.

The toggle bolt further embodies a pair of opposed longitudinal side resilient arms 17 and 18, formed of sheet metal, and spaced from opposite sides of the screw 10 and adapted to be generally coextensive therewith, depending upon the particular length of the screw employed. The resilient arms 17 and 18 are provided at their outer ends with integral outwardly projecting transverse extensions 19, at right angles to the arms 17 and 18. The extensions 19 are formed integral with a flat circular washer 20 and preferably lie close to the inner face of the washer, as shown. The washer 20 has a central opening 21 formed therethrough to receive the screw 10 in assembly.

The free ends of resilient arms 17 and 18 are looped rearwardly upon themselves, in interfitting relation, as clearly shown at 22 and 23 in the drawings. The U-shaped loop 22 integral with the arm 17 lies within the corresponding loop 23 of the other arm 18, as shown, and the two interfitting loops are smoothly rounded and free from positive attachment to each other. The outer loop 23 has a free resilient terminal portion 24 integral therewith, and which extension may project outwardly somewhat from the adjacent arm 17. The entire structure consisting of the arms 17 and the loops 22 and 23 is resilient, springy and readily bendable with the fingers, and the resilient structure will return automatically to the normal position shown, for example, in FIGURE 9, when released by the fingers.

The resilient arms 17 and 18 are each provided along their opposite longitudinal edges with rows of teeth 25, said teeth of the opposed arms 17 and 18 facing each other in spaced opposed relation, FIGURE 1. The rows of teeth 25 extend from a point 26', near and inwardly of the washer 20, to a point 27' near the longitudinal centers of the arms 17 and 18. The teeth 25 are disposed at right angles to the arms 17 and 18 and thus constitute longitudinal guide channels for the screw 10 when the latter is introduced between the arms 17 and 18 in assembly. The teeth 25 taper longitudinally toward the free ends of the arms 17 and 18, and are designed to interlock with the sides 16 of the U-shaped slots 15 during the installation of the toggle bolt to be further described.

FIGURE 3 of the drawings shows the initially flat one-piece or unitary blank from which the resilient arms 17, washer 20 and associated elements are readily formed by simple die operations. The one-piece blank shown in FIGURE 3 is produced by a simple and economical stamping operation as should be obvious.

The operation of the toggle bolt during installation of the same is as follows:

With particular reference to FIGURES 4 through 9, the toggle bolt is adapted to be mounted within a relatively small wall opening 26, formed through wall 15'. The purpose of the toggle bolt is to mount the desired object 27, FIGURE 9, upon the outer face of the wall 15', where no ready access to the interior surface of the wall may be had, except through the small opening 26.

As shown in FIGURE 4, the screw 10 is removed from the remainder of the assembly. The head 11 is rotated about the loops 22 and 23 so as to extend longitudinally of the resilient arms 17 and 18, and these arms together with the extension 24 now lie between the side flanges 14 of the channel-shaped head 11 so that the assembly is extremely slender and able to pass through a very small wall opening 26. The assembly is now gripped by the fingers as indicated in FIGURE 4 and the resilient arms 17 and 18 yield inwardly as shown.

The device is then passed forwardly through the wall opening 26 while held as in FIGURE 4, and as soon as the head 11 clears the inner end of the opening 26, FIGURE 5, the same will swing automatically to the transverse position parallel to the inner face of the wall 15' and assume the position shown in full lines in FIGURE 5. It is the resiliency or spring effect of the arms 17 and 18 and the leaf extension 24 which cause the head 11 to move automatically from the position shown in FIGURE 4 to the transverse position shown in FIGURE 5 after passing through the opening 26. The dimensions of the slots 15 are such that the head 11 may pivot or rotate freely upon the resilient loops 22 and 23.

The screw 10 may now be introduced through the opening 21 of washer head 20 and between the arms 17 and 18 for engagement within the screw-threaded opening 12 of the head 11 as shown in FIGURE 6. If desired, the assembly shown in FIGURE 5 may first be pulled outwardly until the head 11 engages flat against the inner face 28 of wall 15' so as to steady the assembly when the screw 10 is threaded into the opening 12, as in FIGURE 6.

The assembly may then be pushed forwardly as in FIGURE 7 until the washer head 20 bears against the outer face 29 of wall 15', and the screw 10 is then pulled outwardly in the direction of the arrow in FIGURE 7 to shift the head 11 into contact with the inner wall face 28. When this occurs, the side slot portions 16 ride over the beveled teeth 25 and receive the same in interlocking engagement, whereby the head 11 is securely locked by the teeth against movement on the arms 17 and 18 away from the inner wall face 28. The assembly is thereby clamped to the wall 15' by the head 11 and washer head 20 as shown in FIGURES 7 and 8.

With continued reference to the drawings, particularly FIGURE 2, the slots 15 are somewhat wider than the thickness of the arms 17 and 18, as shown. Consequently, when the parts are shifted from their relative positions in FIGURE 6 to the positions of FIGURE 7, the inner opposed faces of the sheet metal arms 17 and 18 slide over the innermost edges of the slots 15 in head 11, as the latter moves toward the teeth 25. When these teeth begin to enter the side slot portions 16 while the parts are approaching their relative positions of FIGURE 7, each beveled tooth passes with a sliding or trip-like or ratchet-like action over the bottom extremities of the slot portions 16, and the outer faces of the arms 17 and 18 may shift apart sufficiently in the slots 15 to allow the teeth to pass through the side slot portions 16. After each side-by-side pair of the teeth 25 clear the slot portions 16, FIGURE 7, the arms 17 and 18 tend to return inwardly toward each other because of the interengaging relationship of the loops 22 and 23, and the teeth become interlocked with the bottoms of the slot portions 16, so that the head 11 cannot move in the opposite direction toward the loops 22 and 23 or away from the wall face 28. That is to say, when the head 11 is drawn over the arms 17 and 18 toward the washer head 20, the rows of teeth 25 trip through the slot portions 16 freely in one direction but the teeth are interlocked with these slot portions and cannot move relative thereto in the reverse direction.

With reference to FIGURE 8, the screw 10 is again removed and the object 27 to be mounted upon the outer face of the wall is brought into place. As shown in FIGURE 9, the screw 10 is placed through the opening 31 of object 27 and between the resilient arms 17 and 18 and re-engaged within the screw-threaded opening 12 and finally tightened to secure the object 27 firmly to the wall 15'.

The screw 10 preferably has a pointed end, as shown in the drawings, and if a long screw is employed, or if the object 27 is extremely thin, the pointed end of the screw 10 will simply engage the loops 22 and 23 and the latter will open up to allow passage of the screw beyond them if necessary.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A toggle bolt comprising a screw element, an elongated channel-shaped toggle element having a central opening for screw-threaded engagement with the screw element and extending transversely of the screw element when engaged therewith on opposite sides of the same, generally U-shaped slots formed through the toggle element on opposite sides of the screw element and said opening, a pair of resilient sheet metal arms engageable through said slots and extending lengthwise of the screw element on opposite sides of the same, rows of teeth carried by the longitudinal edges of said arms for interlocking engagement with the sides of said U-shaped slots, an apertured head interconnecting corresponding ends of said arms and receiving the screw element, and a generally U-shaped loop carried by the other corresponding ends of said arms and engageable through said slots, whereby the toggle element may be pivoted upon said loop to lie substantially parallel to said arms, the resiliency of said arms and loop tending normally to hold the toggle element transversely of said arms and screw element.

2. A toggle bolt comprising a pair of elongated resilient sheet metal arms having teeth arranged in rows along their opposite longitudinal edges and throughout a portion of their lengths, the teeth of the arms being in opposed relation and forming with said arms opposed channel-like guides, transverse extensions formed integral with corresponding ends of said arms, a flat centrally apertured washer head integrally secured to said extensions and lying close to the outer sides thereof, the arms including free end portions reversely bent and interfitting to form a generally U-shaped normally closed resilient loop including an outer free extremity serving as a leaf spring, a toggle head having a screw-threaded opening centrally thereof and opposed substantially U-shaped slots on opposite sides of said opening, said slots including main portions slidably receiving said arms and loop, and a screw engageable through said screw-threaded opening and between said arms, said teeth adapted to have interlocking engagement with side portions of said slots to secure the toggle element in a selected adjusted position longitudinally of said arms, said toggle element adapted to swing around said loop to extend longitudinally of said arms and to be gripped by the fingers with said arms for introduction through a wall opening, said arms, loop and leaf spring automatically swing said toggle element to a position transversely of said arms after passage of the toggle element longitudinally through said wall opening.

3. A toggle bolt comprising a resilient elongated generally U-shaped sheet metal body portion including spaced arms and a closed bight portion, inwardly projecting teeth on said arms in spaced relation lengthwise thereof adjacent the opposite longitudinal edges of the arms and extending substantially at right angles thereto, an apertured head element secured to the ends of said arms remote from said bight portion, and a toggle element having a screw-threaded opening and slots on opposite sides of said opening, said slots being generally U-shaped and including main portions slidably receiving said arms and bight portion and side portions receiving said teeth, said toggle element detachably connected with said arms and bight portion, said screw-threaded opening adapted to receive a screw passed longitudinally between said arms.

References Cited in the file of this patent

UNITED STATES PATENTS

| | | |
|---|---|---|
| 1,521,026 | Hubener | Dec. 30, 1924 |
| 2,398,220 | Gelpcke | Apr. 9, 1946 |